US012671249B2

(12) United States Patent (10) Patent No.: US 12,671,249 B2
Hanaoka et al. (45) Date of Patent: Jun. 30, 2026

(54) CONNECTED DC POWER DISTRIBUTION SYSTEM, POWER ADJUSTMENT METHOD AND PROGRAM

(71) Applicant: NTT, Inc.

(72) Inventors: Naoki Hanaoka, Tokyo (JP); Hidetoshi Takada, Tokyo (JP); Toshimitsu Tanaka, Tokyo (JP); Naomichi Nakamura, Tokyo (JP)

(73) Assignee: NTT, Inc., Tokyo (JP)

( * ) Notice: Subject to any disclaimer, the term of this patent is extended or adjusted under 35 U.S.C. 154(b) by 805 days.

(21) Appl. No.: 18/022,107

(22) PCT Filed: Aug. 21, 2020

(86) PCT No.: PCT/JP2020/031730
§ 371 (c)(1),
(2) Date: Feb. 17, 2023

(87) PCT Pub. No.: WO2022/038792
PCT Pub. Date: Feb. 24, 2022

(65) Prior Publication Data
US 2023/0307906 A1 Sep. 28, 2023

(51) Int. Cl.
*H02J 1/10* (2026.01)
*G05B 19/042* (2006.01)
*H02J 1/102* (2026.01)
*H02J 7/00* (2006.01)

(52) U.S. Cl.
CPC ............ *H02J 1/102* (2013.01); *G05B 19/042* (2013.01); *H02J 7/855* (2026.01); *G05B 2219/2639* (2013.01)

(58) Field of Classification Search
CPC ...................................... H02J 1/10; H02J 7/50
See application file for complete search history.

(56) References Cited

U.S. PATENT DOCUMENTS

2016/0248261 A1 8/2016 Tokuda et al.
2021/0028503 A1* 1/2021 Hilligoss ............. H01M 10/425

FOREIGN PATENT DOCUMENTS

JP 2017055580 A 3/2017
JP 2020032831 A 3/2020
JP 2020068636 A 4/2020
WO 2015072304 A1 5/2015

OTHER PUBLICATIONS

Unknown Author "Overview of storage battery equipment" Knowledge and technology of electrical equipment [online] Accessed on Aug. 1, 2020, website: https://electric-facilities.jp/denki9/chiku.html.

* cited by examiner

*Primary Examiner* — Paul B Yanchus, III

(57) ABSTRACT

A connection direct-current power distribution system including a first direct-current power distribution system having a first voltage range and a second direct-current power distribution system having a voltage range narrower than the first voltage range includes a switch and a converter between the first direct-current power distribution system and the second direct-current power distribution system, and the switch is caused to enter a connected state, and power from a first storage battery in the first direct-current power distribution system is supplied to the second direct-current power distribution system via the converter configured to adjust a voltage of the power.

20 Claims, 7 Drawing Sheets

CONNECTED DC POWER DISTRIBUTION SYSTEM, POWER ADJUSTMENT METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2020/031730, filed on 21 Aug. 2020, the disclosure of which is hereby incorporated herein by reference in its entirety.

TECHNICAL FIELD

The present invention relates to a technology for connecting a plurality of direct-current power distribution systems including a storage battery.

BACKGROUND ART

In a communication building or the like, a direct-current power distribution system including a storage battery that is charged by using a floating charging scheme is often used in order not to stop a communication device.

In the floating charging scheme, the storage battery and a load are connected in parallel to a power supply, so that charging of the storage battery and supplying of power to the load are performed from the (AC input) power supply, and the power is supplied to the load from the storage battery in addition to the power supply at the time of a power failure or at the time of using a large current (NPL 1). Therefore, in the floating charging scheme, the storage battery is always continually being charged and discharged.

In the floating charging scheme, when the power supply is stopped, only discharging of the storage battery is performed, the capacity of the storage battery decreases, and an output voltage of the storage battery (=voltage to be supplied to a load) also decreases. That is, the floating charging scheme is a scheme having a wide voltage range. For convenience of description, this scheme is referred to as scheme A.

In the floating charging scheme, there is a scheme in which the storage battery is connected via a converter in order to keep the output voltage from the storage battery in the floating charging scheme constant. For example, this scheme may be used in a direct-current power distribution system that is provided by a renewable energy company. Also in this method, when the power supply is stopped, only discharging of the storage battery is performed, but because an increase in voltage is performed by a converter, an output voltage (=a voltage to be supplied to a load) of the storage battery can be made constant. That is, this scheme is a scheme having a narrow voltage range. This scheme is called scheme B.

CITATION LIST

Non Patent Literature

[NPL 1] Overview of Storage Battery Equipment, https://electrical-facilities.jp/denki9/chiku.html

SUMMARY OF INVENTION

Technical Problem

It is conceivable to effectively utilize storage batteries included in a large number of communication buildings present nationwide, by connecting a direct-current power distribution system of scheme A to a direct-current power distribution system of scheme B for use of renewable energy.

However, the voltage range differs between scheme A and scheme B, as described above. In a case in which a storage battery of scheme A having a wide voltage range is used in scheme B having a narrow voltage range, when the storage battery is discharged and the voltage decreases, the voltage is likely to deviate from the voltage range of the direct-current power distribution system of scheme B.

The present invention has been made in view of the above points, and an object of the present invention is to provide a technology capable of enabling power of a storage battery in a direct-current power distribution system having a wide voltage range to be used in a direct-current power distribution system having a narrow voltage range.

Solution to Problem

According to the disclosed technology, there is provided a connection direct-current power distribution system including a first direct-current power distribution system having a first voltage range and a second direct-current power distribution system having a voltage range narrower than the first voltage range, the connection direct-current power distribution system including:

a switch and a converter between the first direct-current power distribution system and the second direct-current power distribution system, wherein the switch is caused to enter a connected state, and power from a first storage battery in the first direct-current power distribution system is supplied to the second direct-current power distribution system via the converter configured to adjust a voltage of the power.

Advantageous Effects of Invention

According to the disclosed technology, a technology capable of enabling power of a storage battery in a direct-current power distribution system having a wide voltage range to be used in a direct-current power distribution system having a narrow voltage range is provided.

DESCRIPTION OF EMBODIMENTS

Hereinafter, an embodiment of the present invention (the present embodiment) will be described with reference to the drawings. The embodiment to be described below is merely an example, and the embodiments to which the present invention is applied are not limited to the following embodiment.

(System Configuration)

Figure 1:
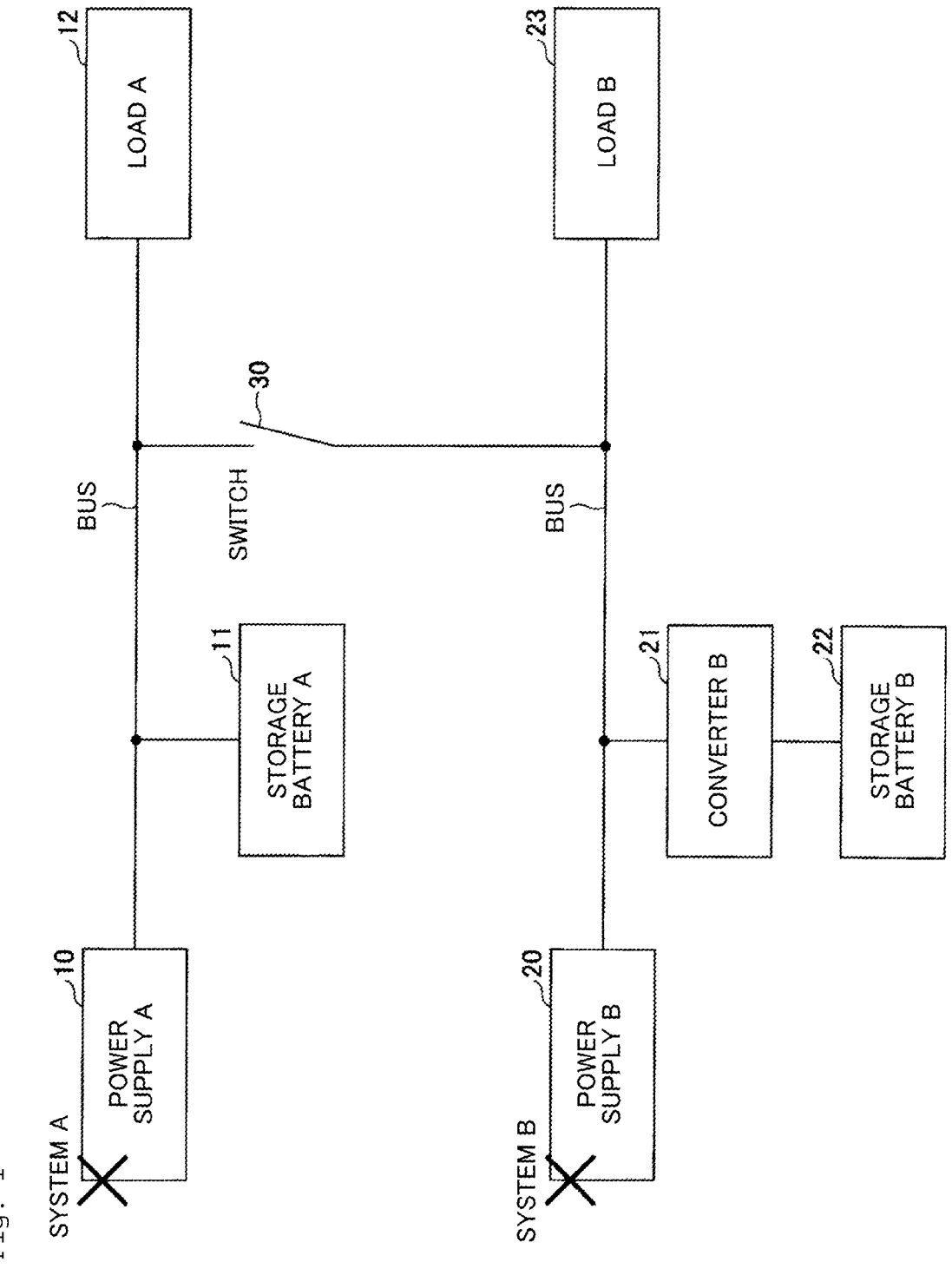
FIG. 1 is a diagram illustrating a problem when a system A is connected to a system B.

First, FIG. 1 illustrates a configuration example in a case in which a technology according to the present invention is not used. A configuration illustrated in FIG. 1 is a configuration in which a bus of a direct-current power distribution system of a system A and a bus of a direct-current power distribution system of a system B are connected via a switch 30. The configuration in which the direct-current power distribution system of the system A and the direct-current power distribution system of the system B are connected via the switch 30 is not the related art.

The direct-current power distribution system of the system A is a system of the above-described scheme A (a floating charging scheme), and includes a power supply A 10 and a storage battery A 11, and a load A 12 is connected to the power supply A 10 and the storage battery A 11 via a bus (power distribution line).

On the other hand, the direct-current power distribution system of the system B is a system of the above-described scheme B, and includes a power supply B 20, a storage battery B 22, and a converter B 21, and a load B 23 is connected to the power supply B 20 and the converter B 21 via a bus (power distribution line).

As described above, a bus voltage range differs between the system A and the system B. For example, the bus voltage range of the system A is 300 V to 400 V, and the bus voltage range of the system B is 350 V to 400 V.

When a remaining capacity of the storage battery B 22 decreases when the power supply A 10 and the power supply B 20 fail, it is possible to supply power from the storage battery A 11 of the system A to the system B by connecting the direct-current power distribution system of the system A to the direct-current power distribution system of the system B using the switch 30.

However, when the storage battery A 11 is discharged and the voltage drops, a bus voltage of the system B is likely to deviate from the voltage range of the system B, and a load device of the system B is likely to stop or fail.

Further, when the storage battery A 11 of the system A suddenly stops due to over-discharge or the like while a capacity of power that can be supplied from the storage battery A 11 of the system A to the system B or a remaining time in which the power can be supplied is unknown, the load device of the system B or a load user is likely to be affected.

Figure 2:
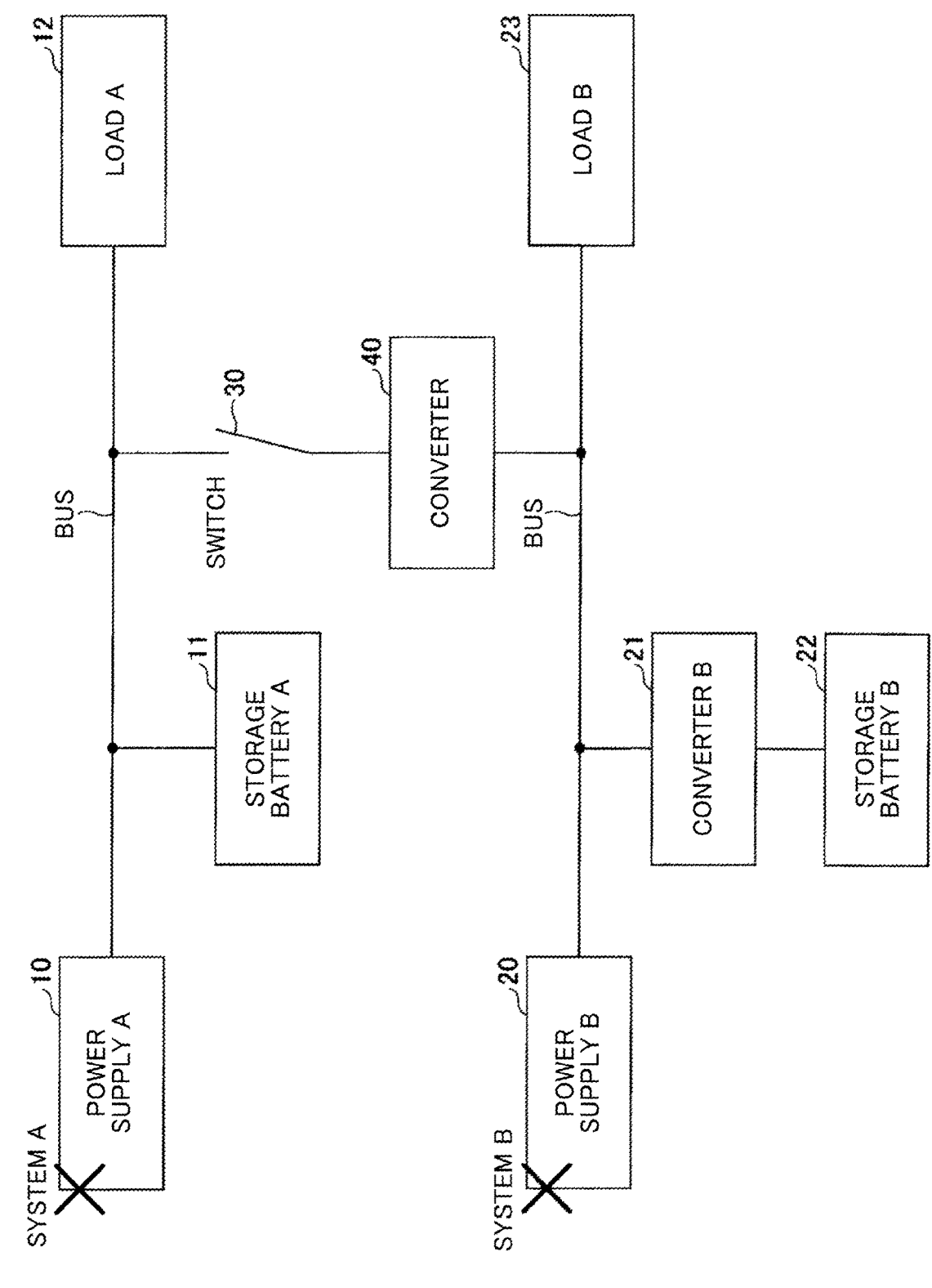
FIG. 2 is a diagram illustrating a configuration example of a system in an embodiment of the present invention.

Therefore, in the present embodiment, a converter 40 between the switch 30 connecting the system A to the system B and the bus of the system B is installed as illustrated in FIG. 2, so that a voltage is adjusted (the voltage is increased or decreased) and then the power is supplied when the power is supplied from the storage battery A 11 of the system A to the system B. This prevents the bus voltage of the system B from deviating from the bus voltage range of the system B. Further, a control device 100, which will be described below, calculates the capacity of power that can be supplied from the storage battery A 11 of the system A to the system B or the time in which the power can be supplied on the basis of information acquired from each device and displays the capacity or the time.

As illustrated in FIG. 2, the direct-current power distribution system in which the system A and the system B are connected via the converter 40 and the switch 30 is referred to as a "connection direct-current power distribution system".

The direct-current power distribution system of the system A is a system of the above-described scheme A (a floating charging scheme) and includes the power supply A 10 and the storage battery A 11, and the load A 12 is connected to the power supply A 10 and the storage battery A 11 via a bus (power distribution line). This is a configuration in which the storage battery A 11 and the load A 12 are connected in parallel to the power supply A 10.

The power supply A 10, the storage battery A 11, and the load A 12 are included in, for example, one base (example: one building). Further, the power supply A 10 and the storage battery A 11 may be included in one base and the load A 12 may be included in another base, or the power supply A 10 may be included in one base and the load A 12 and the storage battery A 11 may be included in another base. Further, the power supply A 10, the storage battery A 11, and the load A 12 may be included in respective different bases.

On the other hand, the direct-current power distribution system of the system B is a system of the above-described scheme B, and includes the power supply B 20, the storage battery B 22, and the converter B 21, and the load B 23 is connected to the power supply B 20 and the converter B 21 via a bus (power distribution line).

The power supply B 20, the storage battery B 22, the converter B 21, and the load B 23 are included in, for example, one base (example: one building). Further, the power supply B 20, the storage battery B 22, and the converter B 21 may be included in one base, and the load B 23 may be included in another base, or the power supply B 20 may be included in one base, and the storage battery B 22, the converter B 21, and the load B 23 may be included in another base. Further, the power supply B 20, the storage battery B 22, the converter B 21, and the load B 23 may be included in respective different bases.

When the direct-current power distribution system of the system B is included in one base and the direct-current power distribution system of the system A is included in one base, these bases may be the same or may differ.

The switch 30 is a device of which ON/OFF can be identified from the outside, which can separate a main circuit from other circuits. For example, an MCCB, an electromagnetic switch, an electromagnetic contactor, or the like can be used as the switch 30. The converter 40 includes an ammeter and a voltmeter, and can communicate with the outside.

The switch 30 and the converter 40 are included in one base. However, the switch 30 and the converter 40 may be included in different bases. Further, a device (panel) in which the switch 30 and the converter 40 are integrated may be used.

The base in which the switch 30 and the converter 40 are included may be a base in which devices of the direct-current power distribution system of the system A are included, a base in which devices of direct-current power distribution system of the system B are included, or may be a base different from the base in which the devices of the direct-current power distribution system of the system A are included and the base in which the devices of the direct-current power distribution system of the system B are included.

(Overview of Operation)

Figure 3:
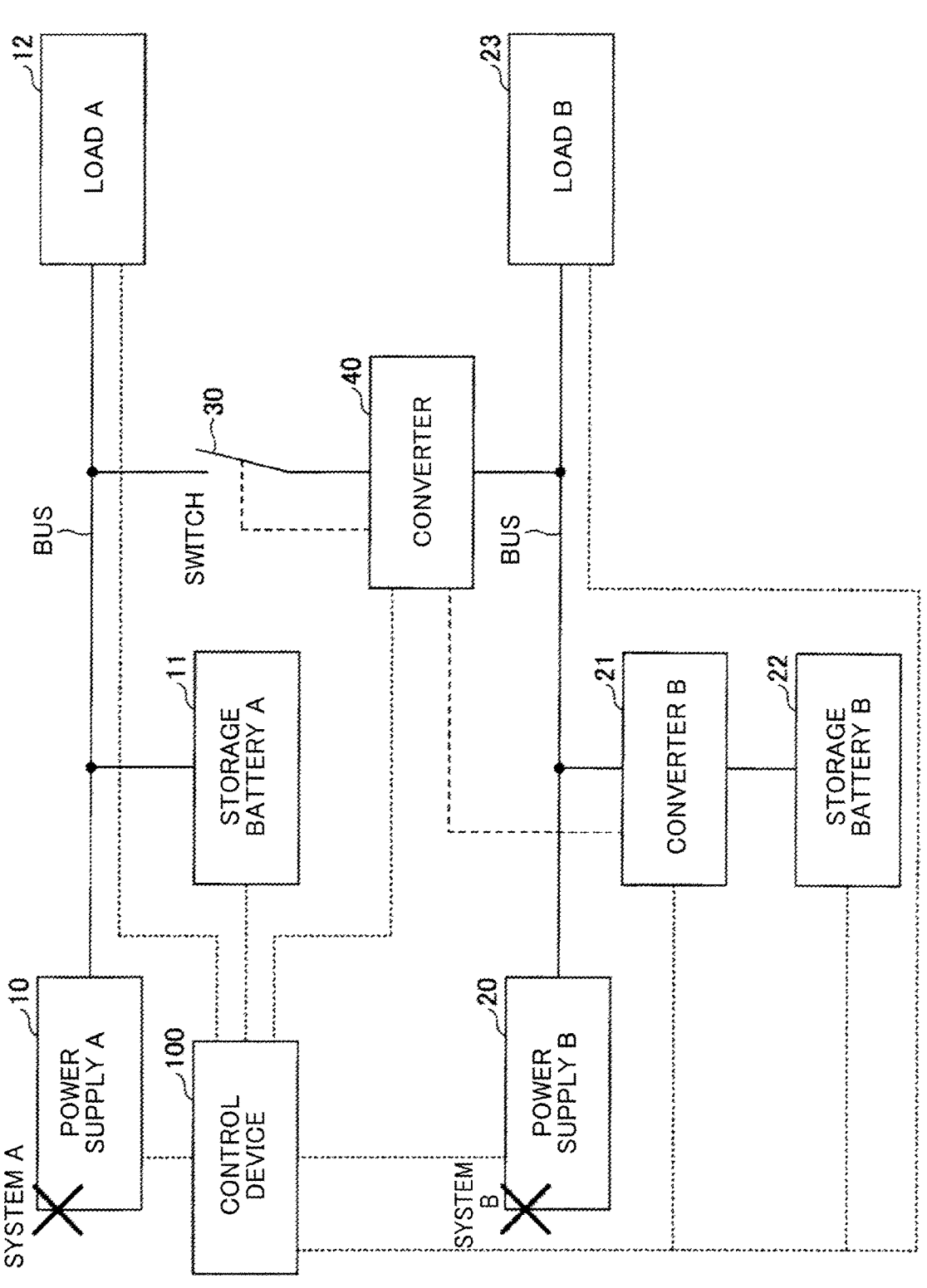
FIG. 3 is a diagram illustrating a configuration example of a system in an embodiment of the present invention.

As illustrated in FIG. 3, the control device 100 is included in the connection direct-current power distribution system. The control device 100 is connected to each of devices constituting the connection direct-current power distribution system via a communication network, and can acquire state information of each device. Further, the control device 100 can transmit a control signal to each device.

The control device 100 may be included in the base in which the devices of the direct-current power distribution system of the system A are included, may be included in the base in which the devices of the direct-current power distribution system of the system B are included, or may be included in the base different from the base in which the devices of the direct-current power distribution system of the system A are included and the base in which the devices of the direct-current power distribution system of the system B are included. Further, the control device 100 may be realized by a virtual machine on a cloud.

Further, the control device 100 may be included inside the device in which the switch 30 and the converter 40 are included. Further, the control device 100 may be included inside the converter 40.

Hereinafter, an overview of an operation of the connection direct-current power distribution system will be described. In the following description, it is assumed that the control device 100 is outside the converter 40. Further, it is assumed that the control device 100 periodically collects information necessary for determination or calculation from each device.

After the power supply A 10 and the power supply B 20 are turned OFF due to a power failure or the like, the control device 100 turns ON the switch 30 (a connected state) so that the system A is connected to the system B when the control device 100 determines that a predetermined condition is satisfied. A specific example of the predetermined condition will be described in a flowchart to be described below. The converter 40 is interlocked with the switch 30 and is activated when the switch is turned ON.

The control device 100 calculates a capacity of power [kWh] that can be supplied from the storage battery A 11 to the system B and a time in which power can be supplied, from an amount of power [kWh] that can be supplied from the storage battery A 11 (calculated from the SOC) and power [kW] used by the load A 12, and displays the capacity and the time. When the capacity of power [kWh] that can be supplied and the time in which the power can be supplied are calculated, an output voltage of the converter 40 is set to a predetermined value in the bus voltage range of the system B, and the calculation is performed under a condition that the supply of power to the system B is stopped when the SOC of the storage battery A 11 becomes equal to or smaller than the threshold value. An example of a calculation method will be described below.

The display may be performed on a display of the control device 100 (a computer), or may be performed on a display unit (for example, a display attached to a device such as a terminal of a system administrator, or a converter) included in each of the bases of the system A and B system.

The converter 40 reads the output voltage of the power supply B 20 or the converter B 21. Alternatively, the control device 100 notifies the converter 40 of the output voltage of the power supply B 20 or the converter B 21. The converter 40 automatically or manually sets a voltage equal to or higher than that voltage as an output voltage. Alternatively, the control device 100 may set the voltage equal to or higher than that voltage as the output voltage with respect to the converter 40.

A voltage designated in advance within the bus voltage range of the system B may be set as the output voltage with respect to the converter 40 without referring to the output voltage of the power supply B 20 or the converter B 21.

Thereafter, when a predetermined condition (described in detail below in the flowchart) is satisfied, the control device 100 turns OFF the switch 30 (a disconnected state). However, because there is concern that an arc may occur when the switch 30 is turned OFF in a state in which the current is flowing from the system A to the system B, a function (an interlocking function) of preventing the switch 30 from being turned OFF unless a current of the converter 40 is 0 is included. This function may be included as a determination logic of the control device 100, or may be included in the converter 40 or the switch 30.

<Calculation of Capacity of Power that can be Supplied and Time in which Power can be Supplied>

As described above, when the switch 30 is turned ON, the control device 100 calculates the capacity of power [kWh] that can be supplied from the storage battery A 11 to the system B and the time in which the power can be supplied, from the amount of power [kWh] that can be supplied from the storage battery A 11 (calculated from the SOC) and the power [kW] used by the load A 12, and displays the capacity and the time.

Regarding the above calculation, for example, the output voltage of the converter 40 is set to the predetermined value in the bus voltage range of the system B, the SOC of the storage battery A 11 and the power used by the load A 12 are set to various values, and simulation is performed on the computer to obtain the capacity of power [kWh] that can be supplied from the storage battery A 11 to the system B and the time in which the power can be supplied for each of various values of the SOC of the storage battery A 11 and the power used by the load A 12.

The capacity of power [kWh] that can be supplied from the storage battery A 11 to the system B and the time in which the power can be supplied are held in a storage unit of the control device 100 for each of various values of the SOC of the storage battery A 11 and the power used by the load A 12. At the time of actual control, the capacity of power [kWh] that can be supplied and the time in which the power can be supplied corresponding to the actual SOC of the storage battery A 11 and the power used by the load A 12 at the time of control are read from the storage unit and displayed.

Further, the control device 100 stores the SOC of the storage battery A 11, the power used by the load A 12, the capacity and time of the supply from the storage battery A 11 to the system B as actual values in the storage unit, and stores a SOC of the storage battery A 11, power used by the load A 12, and a capacity and time of supply from the storage battery A 11 to the system B in connection direct-current power distribution systems in a plurality of other bases as actual values in the storage unit.

Using data of the stored actual value as learning data, the control device 100 may also learn a model for obtaining the capacity of power [kWh] that can be supplied from the storage battery A 11 to the system B and the time in which the power can be supplied, from the SOC of the arbitrary storage battery A 11 and the power used by the load A 12.

A learning scheme is not limited to a specific method, but for example, a neural network model may be used. As an example, the control device 100 inputs the SOC of the storage battery A 11, which is the actual value, and the power used by the load A 12 to the model, and learns parameters of the model so that an output from the model is the actual value of the capacity and time of the supply from the storage battery A 11 to the system B.

Using the learned model, the control device 100 can obtain the capacity of power [kWh] that can be supplied from the storage battery A 11 to the system B and the time in which the power can be supplied, from the SOC of the arbitrary storage battery A 11 and the power used by the load A 12.

(Configuration Example of Control Device 100)

Figure 4:
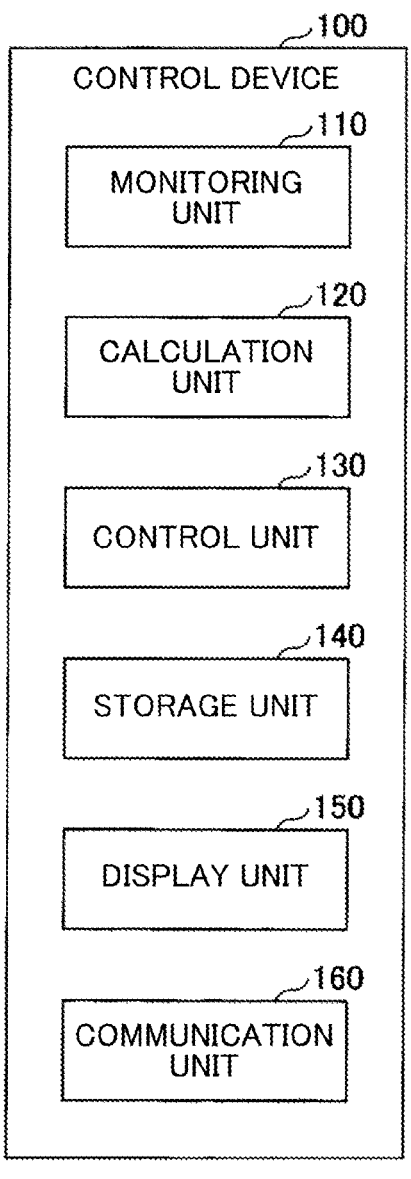
FIG. 4 is a diagram illustrating a configuration example of a control device.

FIG. 4 illustrates a configuration example of the control device 100. As illustrated in FIG. 4, the control device 100 includes a monitoring unit 110, a calculation unit 120, a control unit 130, a storage unit 140, a display unit 150, and a communication unit 160.

The monitoring unit 110 acquires status (including a current value, a voltage value, and the like) of the respective devices and the load constituting the connection direct-current power distribution system. Specifically, the monitoring unit 110 acquires, for example, an ON/OFF state of the switch 30, a voltage and current of the converter B 21, a voltage and current of the converter 40, a voltage and current of the power supplies A 10 and B 20, a voltage and current of the loads A 12 and B 23, and a SOC, voltage, and current of the storage batteries A 11 and B 22.

The calculation unit 120 confirms the output voltage of the converter B 21 and determines the output voltage of the converter 40. This calculation may be performed by the control unit 130.

Further, the calculation unit 120 performs calculation of the capacity of power that can be supplied from the storage battery A 11 to the system B and a time in which the power can be supplied. The calculation of the capacity of power that can be supplied from the storage battery A 11 to the system B and the time in which the power can be supplied may be performed by a device different from the control device 100 (another control device). Further, the calculation unit 120 learns the model using the above-described method, and stores the learned model in the storage unit 140. Further, the calculation unit 120 can perform the calculation of the capacity of power that can be supplied and the time in which the power can be supplied using the learned model.

The control unit 130 performs various determinations and executes operation control of the connection direct-current power distribution system. Further, the control unit 130 can confirm that the output voltage (or preset voltage) of the converter B 21 matches the output voltage of the converter 40, and perform voltage adjustment on the converter 40 or the converter B21 so that the voltages match when the voltages do not match. When the switch 30 is turned OFF (disconnected), the control unit 130 can also confirm that a current flowing through the switch 30 (or the converter 40) is zero and then, release the interlocking of the switch 30.

The storage unit 140 stores the voltages (an input voltage and an output voltage) set in each device, and also stores the ON/OFF state of the switch 30. Further, as described above, the storage unit 140 may store the SOC of the storage battery A 11, the power used by the load A 12, and the capacity and time of supply from the storage battery A 11 to the system B as actual values. Further, the storage unit 140 may store data (the model or the like) necessary for the calculation of the capacity of power that can be supplied from the storage battery A 11 to the system B and a time in which the power can be supplied.

Further, the storage unit 140 stores information on a device configuration (including a load device) of each of the system A and the system B.

The display unit 150 displays, for example, an input voltage and an output voltage of each of the converters B 21 and 40, and the ON/OFF state of the switch 30. Further, the display unit 150 displays that there is an abnormality at the time of abnormality. Further, the display unit 150 displays the capacity of power that can be supplied to the system B and the time in which the power can be supplied.

The communication unit 160 can receive information on the converters B 21 and 40, information on the power supplies A 10 and 20 B, information on the storage batteries A 11 and B 22, information on the loads A 12 and B 23, information on the ON/OFF state of the switch 30, and the like from each device, and notify other devices of these of piece information.

<Hardware Configuration Example>

The control device 100 can be realized, for example, by causing a computer to execute a program. This computer may be a physical computer or may be a virtual machine.

That is, the control device 100 can be realized by executing a program corresponding to processing that is performed by the device, using hardware resources such as a CPU and memory built into the computer. The program can be recorded on a computer-readable recording medium (a portable memory or the like), stored, and distributed. It is also possible to provide the program through a network such as the Internet or e-mail.

Figure 5:
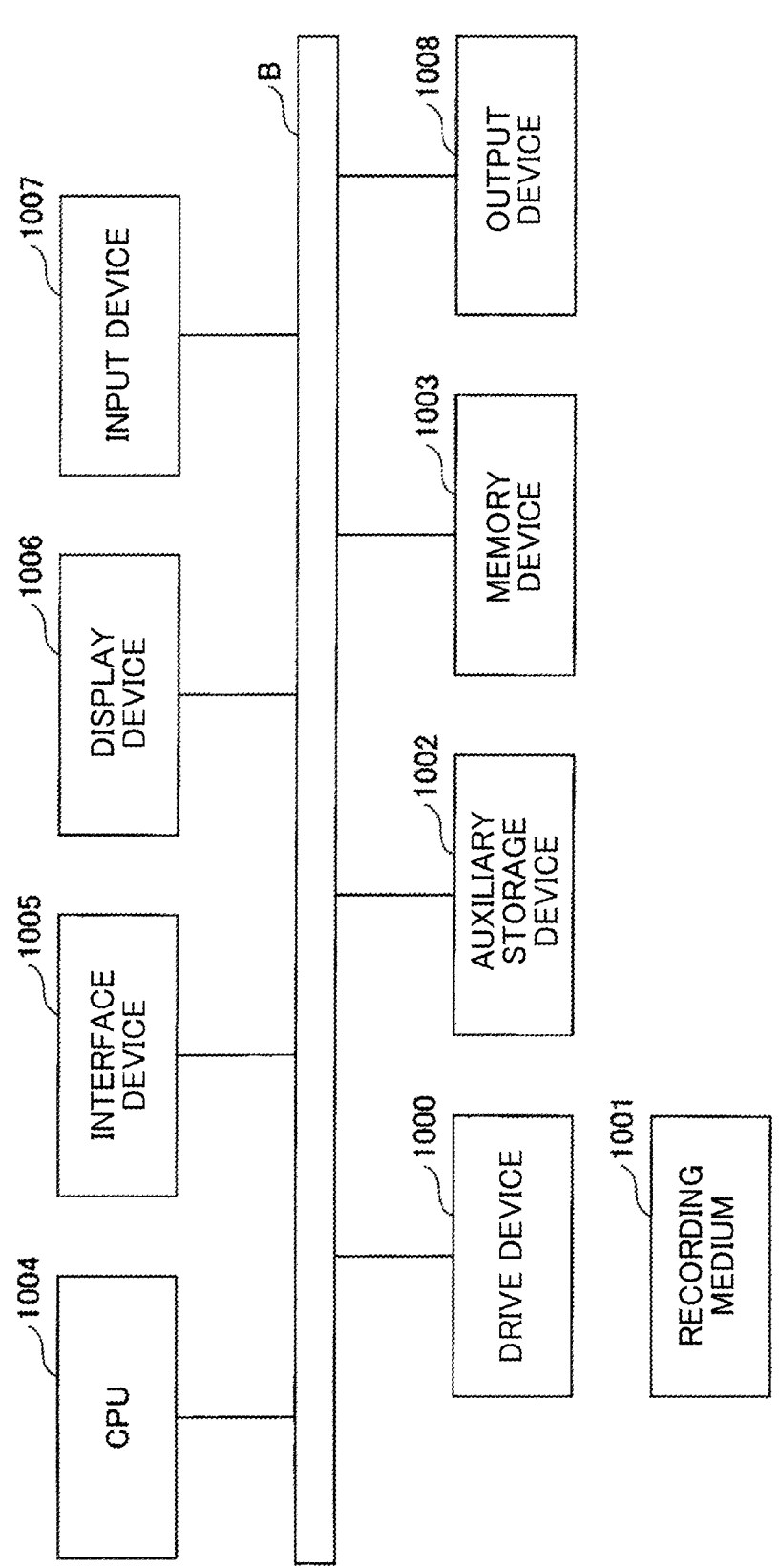
FIG. 5 is a diagram illustrating an example of a hardware configuration of the control device.

FIG. 5 is a diagram illustrating a hardware configuration example of the computer. The computer of FIG. 5 includes a drive device 1000, an auxiliary storage device 1002, a memory device 1003, a CPU 1004, an interface device 1005, a display device 1006, an input device 1007, an output device 1008, and the like, which are connected to each other by a bus BS.

A program for realizing processing in the computer is provided by, for example, a recording medium 1001 such as a CD-ROM or a memory card. When the recording medium 1001 having the program stored therein is set in the drive device 1000, the program is installed in the auxiliary storage device 1002 from the recording medium 1001 via the drive device 1000. However, the program does not necessarily have to be installed from the recording medium 1001, and may be downloaded from another computer via a network. The auxiliary storage device 1002 stores the installed program and also stores necessary files, data, and the like.

The memory device 1003 reads and stores the program from the auxiliary storage device 1002 when there is an instruction to start the program. The CPU 1004 realizes functions related to the control device 100 according to a program stored in the memory device 1003. The interface device 1005 is used as an interface for connection to a network and functions as a transmission unit and reception unit. The display device 1006 displays a graphical user interface (GUI) or the like according to a program. The input device 1007 is configured of a keyboard, a mouse, buttons, a touch panel, or the like, and is used to input various operation instructions. The output device 1008 outputs a calculation result.

(Operation Flow)

Figure 6:
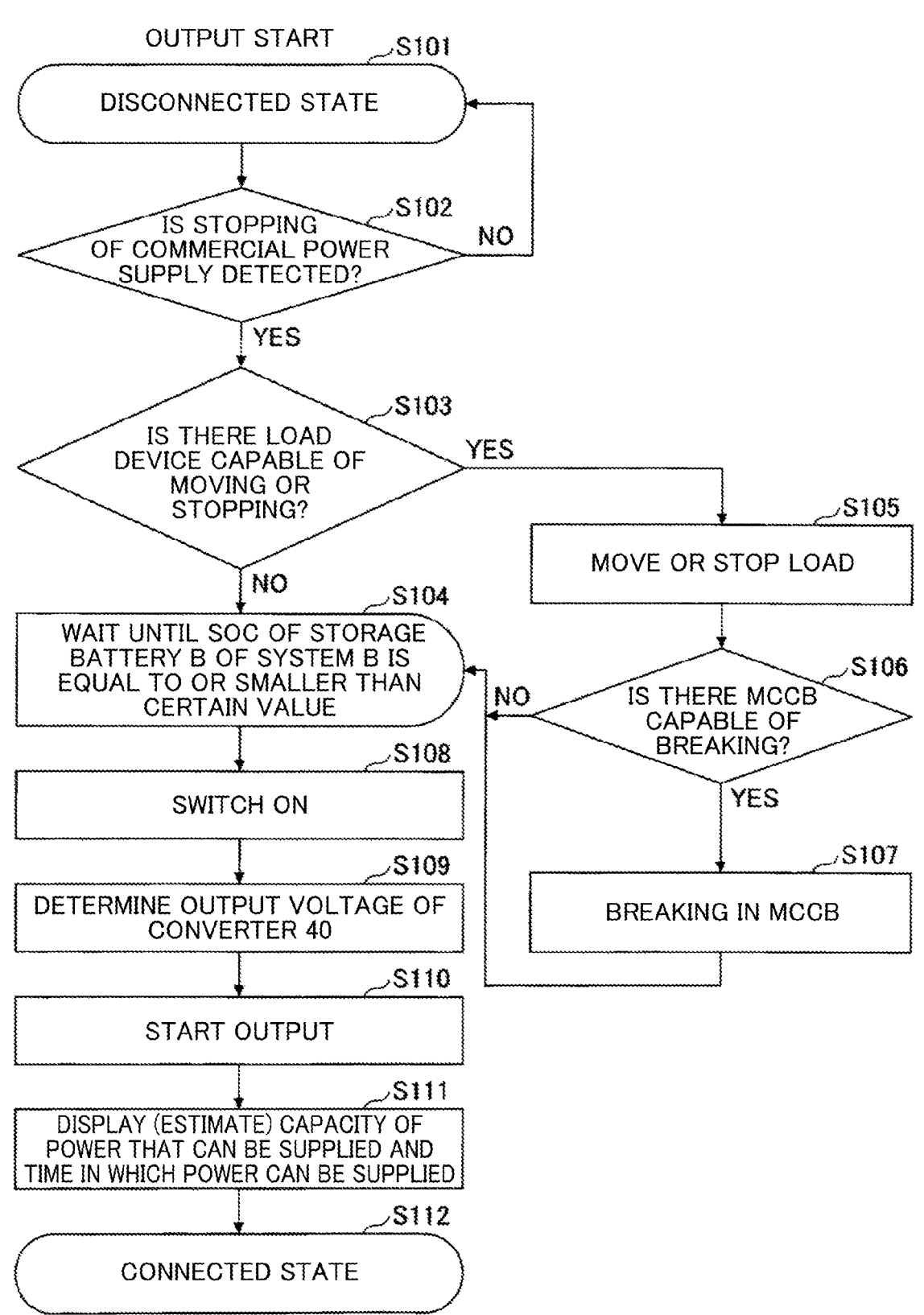
FIG. 6 is a flowchart illustrating an operation of the system.
Figure 7:
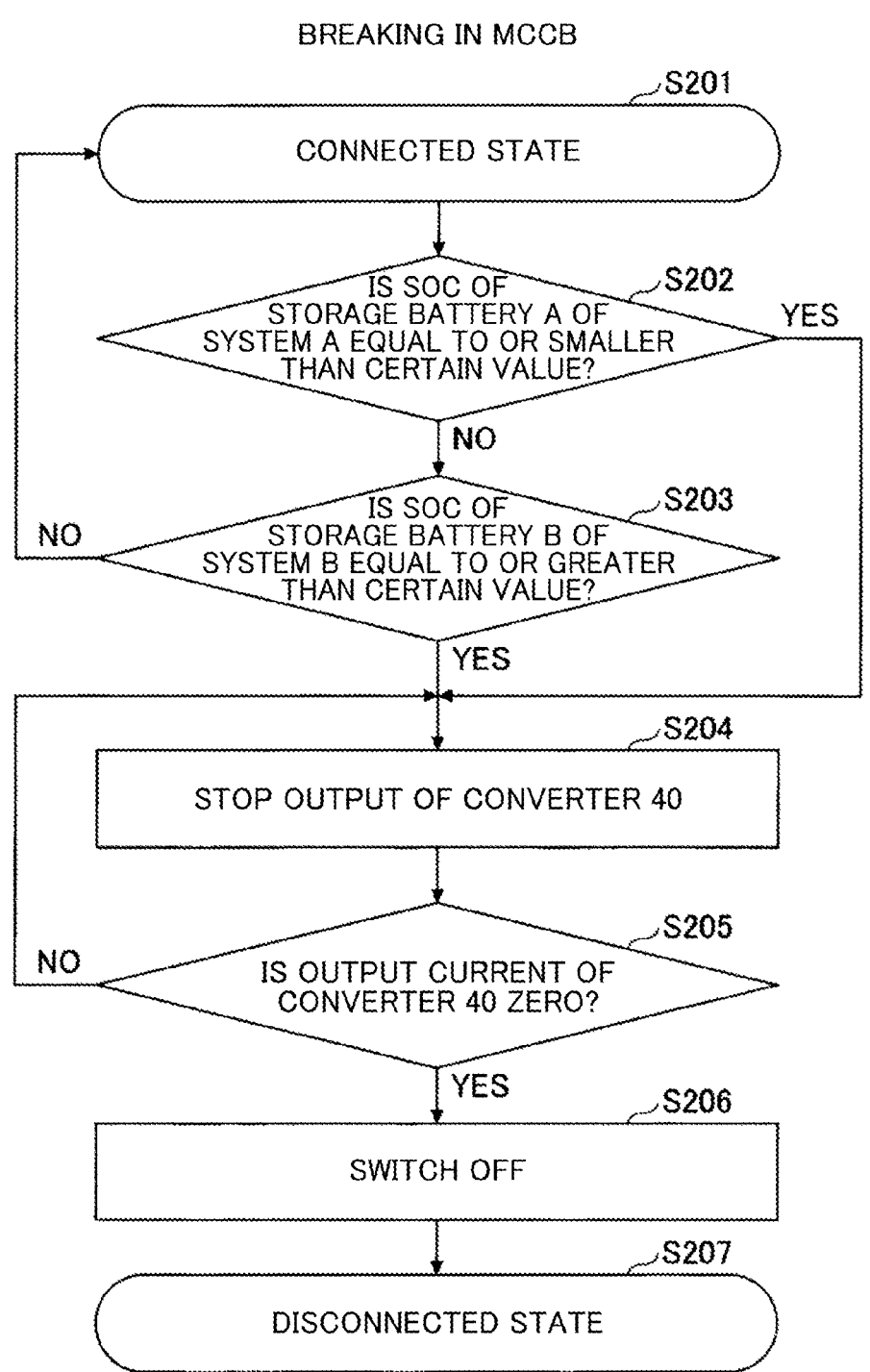
FIG. 7 is a flowchart illustrating the operation of the system.

Next, a detailed operation example of the control device 100 in the connection direct-current power distribution system of FIG. 3 will be described with reference to the flowcharts of FIGS. 6 and 7. The control unit 130 mainly executes an operation in the flowchart on the basis of information of each device acquired by the monitoring unit 110.

First, a flow when the output from the converter 40 starts will be described with reference to FIG. 6.

In S101, the system A and the system B are in the disconnected state, and both the power supply A 10 and the power supply B 20 are operating normally.

When the power supply A 10 and the power supply B 20 are stopped due to a power failure or the like, the control unit 130 detects that the power supply A 10 and the power supply B 20 are stopped in S102. In S103, the control unit 130 determines whether or not there is a load device such as an ICT device capable of moving or stopping in each of the system A and the system B on the basis of the information stored in the storage unit 140.

When the determination of S104 is Yes, the processing proceeds to S105. In S105, the control unit 130 performs control to move or stop the load on the load device capable of moving or stopping the load. Moving the load means, for example, switching between communication paths so that data to the load device (a server or the like) is transmitted to another device. Further, stopping the load means, for example, turning OFF the load device.

In S106, the control unit 130 determines whether or not there is an MCCB (for example, a circuit breaker capable of breaking power that is supplied to the stopped load device) of capable of breaking when the load is stopped, breaking is performed in the MCCB (either remotely or manually) in S107 in the case of Yes, and the processing proceeds to S104 in the case of No.

In S104, the control unit 130 waits until an SOC of the system B storage battery B 22 becomes equal to or smaller than a certain value. When the SOC of the storage battery B 22 of the system B becomes equal to or smaller than the certain value, the control unit 130 proceeds to S108 and the control unit 130 turns ON the switch 30.

In S109, the calculation unit 120 (or the control unit 130) confirms the output voltage of the converter B 21, and determines a voltage equal to or higher than the output voltage to be the output voltage of the converter 40. As described above, the calculation unit 120 (or the control unit 130) may determine the output voltage of the converter 40 to be a predetermined voltage within the voltage range of the system B.

In S110, the control unit 130 sets the output voltage determined in S109 for the converter 40 and causes the output of the converter 40 to start. Further, in S111, the calculation unit 110 calculates the capacity of power that can be supplied to the system B and the time in which the power can be supplied, and the display unit 150 displays the capacity of power that can be supplied to the system B and the time in which the power can be supplied. In S112, the system A and the system B are in a connected state.

Subsequently, a flow when the output is stopped by the converter 40 will be described with reference to FIG. 7.

In S201, the system A and the system B are in the connected state. In S202, the control unit 130 determines whether or not the SOC of the storage battery A 11 of the system A is equal to or smaller than a certain value (a predetermined value). The processing proceeds to S204 when a determination result of S202 is Yes, and to S203 when the determination result of S202 is No.

In S203, the control unit 130 determines whether or not the SOC of the storage battery B 22 of the system B is equal to or higher than the certain value (predetermined value). The processing returns to S201 when the determination result of S203 is No, and proceeds to S204 when the determination result of S203 is Yes. The storage battery B 22 of the system B is charged with the power from the system A, and the SOC of the storage battery B 22 increases. Alternatively, the power supply B 20 of the system B is restored such that the storage battery A 22 of the system B is charged and the SOC of the storage battery B 22 is increased. In S203, the control unit 130 may proceed to S204 when the control unit 130 detects that the power supply B 20 has been restored.

In S204, the control unit 130 stops the output of the converter 40 (for example, sets the output voltage of the converter 40 to a value lower than the output voltage of any one of the power supply B 20 and the converter B 21). In S205, the control unit 130 determines whether or not an output current of the converter 40 becomes zero. When the output current of the converter 40 becomes zero, the processing proceeds to S206.

In S206, the control unit 130 turns OFF the switch. In S207, the switch enters a disconnected state.

Effects of Embodiment

According to the technology according to the present embodiment described above, when the system A and the system B having different voltage ranges are connected to each other, the connection can be safely performed without deviating from the voltage range.

Further, in the configuration in which the system A and the system B are connected, it is possible to determine a usage priority of the storage battery A 11 and the storage battery B 22 in the system B by adjusting the output voltage of the converter B 21 and the output voltage of the converter 40. For example, the output voltage of the converter B 21 is set to be higher than the output voltage of the converter 40, so that the storage battery B 22 can be used preferentially. Further, the output voltage of the converter B 21 is set to be lower than the output voltage of the converter 40, so that the storage battery A 11 can be preferentially used. Further, because an arc is not generated by an interlocking mechanism, the switch 30 can be safely turned OFF.

Further, when the converter 40 detects that the voltage in the bus of the system B exceeds a predetermined voltage (that is, the power supply B 20 is restored), the converter 40 can also automatically stop the output. Further, it is possible to clearly ascertain the capacity of power that can be supplied from the storage battery A 11 of the system A to the system B and a remaining time.

Conclusion of Embodiments

The present specification discloses at least the connection direct-current power distribution system, the power adjustment method, and the program of the following items.

(Item 1)

A connection direct-current power distribution system including a first direct-current power distribution system having a first voltage range and a second direct-current power distribution system having a voltage range narrower than the first voltage range, the connection direct-current power distribution system including:

a switch and a converter between the first direct-current power distribution system and the second direct-current power distribution system, wherein the switch is caused to enter a connected state, and power from a first storage battery in the first direct-current power distribution system is supplied to the second direct-current power distribution system via the converter configured to adjust a voltage of the power.

(Item 2)

The connection direct-current power distribution system according to item 1, wherein the second direct-current power distribution system includes a second storage battery and a second converter, and is configured to supply power from the second storage battery to a load via the second converter, and a voltage equal to or higher than an output voltage of the second converter is set as an output voltage of the converter, so that the output of power is started from the converter.

(Item 3)

The connection direct-current power distribution system according to item 1 or 2, wherein, when an index value indicating a remaining capacity of the first storage battery becomes equal to or smaller than a predetermined threshold value, the output of the converter is stopped.

(Item 4)

The connection direct-current power distribution system according to any one of items 1 to 3, wherein, when the output of the converter is stopped, the switch is caused to enter a disconnected state after an output current from the converter becomes zero.

(Item 5)

The connection direct-current power distribution system according to any one of items 1 to 4, further comprising:

a calculation unit configured to calculate a capacity of power that is able to be supplied from the first storage battery to the second direct-current power distribution system and a time in which the power is able to be supplied, on the basis of an amount of power that is able to be supplied by the first storage battery and power used by a load connected to the first direct-current power distribution system; and a display unit configured to display the capacity of power that is able to be supplied and the time in which the power is able to be supplied, the capacity and the time being calculated by the calculation unit.

(Item 6)

The connection direct-current power distribution system according to item 5, wherein the calculation unit learns a model using an actual value of the amount of power that is able to be supplied by the first storage battery, an actual value of power used by a load connected to the first direct-current power distribution system, and an actual value of the capacity of power that is able to be supplied from the first storage battery to the second direct-current power distribution system and the time in which the power is able to be supplied, and calculates the capacity of power that is able to be supplied from the first storage battery to the second direct-current power distribution system and the time in which the power is able to be supplied, by using the learned model.

(Item 7)

A voltage adjustment method in a connection direct-current power distribution system including a first direct-current power distribution system having a first voltage range and a second direct-current power distribution system having a voltage range narrower than the first voltage range, wherein a switch and a converter are included between the first direct-current power distribution system and the second direct-current power distribution system, and the switch is caused to enter a connected state, and power from a first storage battery in the first direct-current power distribution system is supplied to the second direct-current power distribution system via the converter configured to adjust a voltage of the power.

(Item 8)

A program for causing a computer to function as the respective units in the control device according to item 5 or 6.

Although the embodiment has been described above, the present invention is not limited to such a specific embodiment, and various modifications and changes can be made within the scope of the gist of the present invention described in the claims.

REFERENCE SIGNS LIST

10 Power supply A
11 Storage battery A
12 Load
20 Power supply B
21 Converter B
22 Storage battery B
23 Load B
30 Switch
40 Converter
110 Monitoring unit
120 Calculation unit
130 Control unit
140 Storage unit
150 Display unit
160 Communication unit
1000 Drive device
1001 Recording medium
1002 Auxiliary storage device
1003 Memory device
1004 CPU
1005 Interface device
1006 Display device
1007 Input device

The invention claimed is:

1. A connection direct-current power distribution system comprising:

a first direct-current power distribution system having a first voltage range;

a second direct-current power distribution system having a voltage range narrower than the first voltage range;

a switch and a converter between the first direct-current power distribution system and the second direct-current power distribution system, wherein the switch is caused to enter a connected state, and power from a first storage battery in the first direct-current power distribution system is supplied to the second direct-current power distribution system via the converter configured to adjust a voltage of the power.

2. The connection direct-current power distribution system according to claim 1, wherein the second direct-current power distribution system includes a second storage battery and a second converter, and is configured to supply power from the second storage battery to a load via the second converter, and a voltage equal to or higher than an output voltage of the second converter is set as an output voltage of the converter, so that the output of power is started from the converter.

3. The connection direct-current power distribution system according to claim 1, wherein, when an index value indicating a remaining capacity of the first storage battery becomes equal to or smaller than a predetermined threshold value, the output of the converter is stopped.

4. The connection direct-current power distribution system according to claim 3, wherein, when the output of the converter is stopped, the switch is caused to enter a disconnected state after an output current from the converter becomes zero.

5. The connection direct-current power distribution system according to claim 1, further comprising:

a power determiner configured to calculate a capacity of power that is able to be supplied from the first storage battery to the second direct-current power distribution system and a time in which the power is able to be supplied, on the basis of an amount of power that is able to be supplied by the first storage battery and power used by a load connected to the first direct-current power distribution system; and a display configured to display the capacity of power that is able to be supplied and the time in which the power is able to be supplied, the capacity and the time being calculated by the power determiner.

6. The connection direct-current power distribution system according to claim 5, wherein the power determiner is further configured to:

learn a model using an actual value of the amount of power that is able to be supplied by the first storage battery, an actual value of power used by a load connected to the first direct-current power distribution system, and an actual value of the capacity of power that is able to be supplied from the first storage battery to the second direct-current power distribution system and the time in which the power is able to be supplied, and calculate the capacity of power that is able to be supplied from the first storage battery to the second direct-current power distribution system and the time in which the power is able to be supplied, by using the learned model.

7. A voltage adjustment method in a connection direct-current power distribution system including a first direct-current power distribution system having a first voltage range, a second direct-current power distribution system having a voltage range narrower than the first voltage range, a switch and a converter included between the first direct-current power distribution system and the second direct-current power distribution system, the voltage adjustment method comprising:

controlling a connection between the first direct-current power distribution system and the second direct-current power distribution system using the switch, the connection including a connected state and a disconnected state, wherein when the connection is in the connected state, power from a first storage battery in the first direct-current power distribution system is supplied to the second direct-current power distribution system via the converter to adjust a voltage of the power.

8. A computer-readable non-transitory medium storing computer-executable program instructions, that when executed by a processor causes a computer to perform the method of claim 7.

9. The computer-readable non-transitory medium of claim 8, wherein the instructions when executed by the processor further cause the computer to:

calculate a capacity of power that is able to be supplied from the first storage battery to the second direct-current power distribution system and a time in which the power is able to be supplied, on the basis of an amount of power that is able to be supplied by the first storage battery and power used by a load connected to the first direct-current power distribution system; and display the capacity of power that is able to be supplied and the time in which the power is able to be supplied.

10. The computer-readable non-transitory medium of claim 8, wherein the second direct-current power distribution system includes a second storage battery and a second converter.

11. The computer-readable non-transitory medium of claim 8, wherein the instructions when executed by the processor further cause the computer to:

stop the output of the converter when an index value indicating a remaining capacity of the first storage battery becomes equal to or smaller than a predetermined threshold value.

12. The voltage adjustment method of claim 7, further comprising:

calculating a capacity of power that is able to be supplied from the first storage battery to the second direct-current power distribution system and a time in which the power is able to be supplied, on the basis of an amount of power that is able to be supplied by the first storage battery and power used by a load connected to the first direct-current power distribution system; and displaying the capacity of power that is able to be supplied and the time in which the power is able to be supplied.

13. The voltage adjustment method of claim 12, further comprising:

learning a model using an actual value of the amount of power that is able to be supplied by the first storage battery, an actual value of power used by a load connected to the first direct-current power distribution system, and an actual value of the capacity of power that is able to be supplied from the first storage battery to the second direct-current power distribution system, and the time in which the power is able to be supplied; and calculating the capacity of power that is able to be supplied from the first storage battery to the second direct-current power distribution system and the time in which the power is able to be supplied, by using the learned model.

14. The voltage adjustment method of claim 13, further comprising:

supplying power from the second storage battery to a load via the second converter, and a voltage equal to or higher than an output voltage of the second converter is set as an output voltage of the converter, so that the output of power is started from the converter.

15. The voltage adjustment method of claim 14, further comprising:

in response to determining that the output of the converter has been stopped and an output current from the converter becomes zero, causing the connection to enter a disconnected state.

16. The computer-readable non-transitory medium of claim 15, wherein the instructions when executed by the processor further cause the computer to:

learn a model using an actual value of the amount of power that is able to be supplied by the first storage battery, an actual value of power used by a load connected to the first direct-current power distribution system, and an actual value of the capacity of power that is able to be supplied from the first storage battery to the second direct-current power distribution system, and the time in which the power is able to be supplied; and calculate the capacity of power that is able to be supplied from the first storage battery to the second direct-current power distribution system and the time in which the power is able to be supplied, by using the learned model.

17. The computer-readable non-transitory medium of claim 16, wherein the instructions when executed by the processor further cause the computer to:

supply power from the second storage battery to a load via the second converter, and a voltage equal to or higher than an output voltage of the second converter is set as an output voltage of the converter, so that the output of power is started from the converter.

18. The computer-readable non-transitory medium of claim 17, wherein the instructions when executed by the processor further cause the computer to:

in response to the determination that the output of the converter has been stopped and an output current from the converter becomes zero, cause the connection to enter a disconnected state.

19. The voltage adjustment method of claim 7, wherein the second direct-current power distribution system includes a second storage battery and a second converter.

20. The voltage adjustment method of claim 7, further comprising:

stopping the output of the converter when an index value indicating a remaining capacity of the first storage battery becomes equal to or smaller than a predetermined threshold value.

\* \* \* \* \*